United States Patent
Yock (10) Patent No.: US 6,916,765 B2
(45) Date of Patent: Jul. 12, 2005

(54) CONSUMER PRODUCT PACKAGE AND METHOD OF MANUFACTURE

(75) Inventor: Joseph P. Yock, Cincinnati, OH (US)

(73) Assignee: The C. W. Zumbiel Co., Cincinnati, OH (US)

( * ) Notice: Subject to any disclaimer, the term of this patent is extended or adjusted under 35 U.S.C. 154(b) by 4 days.

(21) Appl. No.: 10/646,148

(22) Filed: Aug. 22, 2003

(65) Prior Publication Data

US 2004/0176232 A1 Sep. 9, 2004

Related U.S. Application Data

(60) Provisional application No. 60/452,411, filed on Mar. 6, 2003.

(51) Int. Cl.[7] .......................... B41M 5/035; B41M 5/38
(52) U.S. Cl. .................. 503/227; 428/32.51; 428/32.6; 503/204
(58) Field of Search .......................... 428/32.6; 503/204

(56) References Cited

U.S. PATENT DOCUMENTS

| | | | |
|---|---|---|---|
| 2,911,280 A | 11/1959 | Cicogna | 8/2.5 |
| 3,502,495 A | 3/1970 | Akamatsu | 117/38 |
| 3,508,492 A | 4/1970 | Seibert et al. | 101/470 |
| 3,549,082 A | 12/1970 | Simpson | 229/51 |
| 4,021,591 A | 5/1977 | DeVries et al. | 428/200 |
| 4,104,816 A | 8/1978 | Pingeton | 40/2 R |
| 4,202,663 A | 5/1980 | Haigh et al. | 8/471 |
| 4,306,367 A | 12/1981 | Otto | 40/312 |
| 4,308,679 A * | 1/1982 | Ray et al. | 40/312 |
| 4,324,823 A | 4/1982 | Ray, III | 428/43 |
| 4,576,610 A | 3/1986 | Donenfeld | 8/471 |
| 4,645,705 A | 2/1987 | Abbott, Jr. | |
| 4,654,044 A | 3/1987 | Gilardone, Jr. | 8/471 |
| D290,584 S | 6/1987 | Lotterer | D9/345 |
| 5,554,213 A | 9/1996 | Radigan, Jr. et al. | 106/22 |
| 5,555,008 A | 9/1996 | Stoffel et al. | 347/100 |
| 5,682,984 A | 11/1997 | Hoell et al. | 206/161 |
| 5,874,196 A | 2/1999 | Chapman et al. | 430/201 |
| 6,082,614 A | 7/2000 | Schmidt | 229/123.3 |
| 6,174,400 B1 * | 1/2001 | Krutak et al. | 428/32.6 |
| 6,312,122 B1 | 11/2001 | Brown et al. | 347/101 |
| 6,367,178 B1 | 4/2002 | Chmiel | 40/1.5 |
| 6,413,617 B1 | 7/2002 | Schlier | 428/195 |
| 6,470,653 B1 | 10/2002 | Lutz et al. | 53/526 |
| 6,494,324 B2 | 12/2002 | Ours et al. | 206/527 |
| 6,594,927 B2 | 7/2003 | Witkowski | 40/310 |

OTHER PUBLICATIONS

International Paper, *Pocket Pal, A Graphic Arts Production Handbook,* 19th Edition, Introductory pages and p. 58 and 232 (5 pages).

* cited by examiner

Primary Examiner—Bruce Hess
(74) Attorney, Agent, or Firm—Wood, Herron & Evans, LLP (57) ABSTRACT

The invention relates to consumer product packages having impact promotional items printed directly on the package and methods for manufacturing such product packages. An image constituting the impact promotional item is printed using blended printing inks and sublimation dyes onto a paperboard blank, which is folded to form a product package. The printed image has a visual appearance substantially unchanged from a conventional printed image. The sublimation dyes present in the printed image supply a transferrable image component that, following transfer to a substrate such as a fabric article, accurately reproduces the printed image viewed by the consumer on the product package. Printing ink and sublimation dye blends for printing the image are also disclosed, as are methods for transferring the transferrable image component to an article, such as a fabric article or textile.

24 Claims, 3 Drawing Sheets

CONSUMER PRODUCT PACKAGE AND METHOD OF MANUFACTURE

CROSS-REFERENCE TO RELATED APPLICATIONS

This application claims the benefit of U.S. Provisional Application No. 60/452,411, filed Mar. 6, 2003, the disclosure of which is hereby incorporated by reference herein in its entirety.

FIELD OF THE INVENTION

The present invention relates to a consumer product package and, more particularly, to a consumer product package bearing a printed image having a transferrable image component.

BACKGROUND OF THE INVENTION

Consumer product manufacturers routinely include or associate a premium with product packaging for promoting the sale of the product beyond the marketability of the product alone. Generally, the premium is a relatively inexpensive item provided to the consumer as a purchase enticement without increasing the purchase price. The premium may be an engagement on a package panel that requires some level of consumer interaction, such as a printed maze, a connect-the-dots pattern, or a composite image concealing a hidden sub-image. Alternatively, the premium may be an impact promotional item, such as a coupon, toy, or novelty item, inserted into the product package. One familiar example is a child's toy inserted in a box of breakfast cereal. Typically, the impact promotional item is retrieved from the product package after the package is opened and/or the product is at least partially consumed or otherwise removed.

Placing impact promotional items inside the product package, as is conventional, suffers from several significant disadvantages. Because the item is concealed from view, the manufacturer cannot verify that a premium is actually present in any particular product package. The promotional item is typically dropped by hand into the product package, which adds labor cost and slows production. If the promotional item is missing from the product package due to human error, complaints from dissatisfied consumers may reduce the product's and/or company's market appeal.

Printed advertising on the package exterior is required to indicate the existence of the hidden promotional item. Otherwise, the presence of the promotional item is undetectable by the consumer. Moreover, the visibility of only a representative image of the promotional item in the printed advertising on the exterior of the product package reduces its promotional value. Another disadvantage of in-package promotional items is that such items must be sanitized and wrapped before insertion into the product package to isolate the promotional item from the package contents.

What is needed, therefore, is a product package and method for its manufacture that overcomes the various deficiencies of associating an impact promotional item with the product package.

SUMMARY OF INVENTION

According to this invention, a consumer product package includes a foldable blank having at least one panel and a transferrable image printed onto the at least one panel. The blank forms the product package when folded. The image is transferrable from the panel of the blank to a substrate, such as textile, fabric or other article.

According to the principles of the invention, an impact promotional item for a consumer product package includes a transferrable image printed onto a package panel, in which the image is transferrable from the panel to a substrate such as a fabric, textile or other article.

Another aspect of the invention is directed to a method for applying an image to a consumer product package. The method includes blending a printing ink with a sublimation dye and printing the image on the consumer product package using the blended printing ink and sublimation dye.

A still further aspect of the invention is directed to a method for promoting a product, a service, or an organization. The method includes putting a transferrable image on a panel of a consumer product package and transferring the image thermally from the panel to a textile, fabric or other article.

An impact promotional item in accordance with the principles of the invention is relatively inexpensive and may be associated with the product package at little or no additional manufacturing cost or production time other than those associated with the elements of this invention. Normal product handling is not disrupted, unlike when conventional impact promotional items are inserted into a product package. In contrast, the impact promotional item is printed on the package blank before the blank is folded to form the product package and filled with product. Because the impact promotional item is printed directly on either the inside or the outside of the product package, the cost of the impact promotional item does not significantly increase the production cost nor does the addition of the impact promotional item slow the throughput of the package filling process for the product package. Specifically, the impact promotional item is not dropped by hand into the product package, which eliminates such labor costs. Preferably, the printed image and other package indicia are printed in a single pass through a printing line.

Every product package categorically receives an impact promotional item as missed package drops arising from inherent human error are eliminated. The impact promotional item of the invention does not have to be manufactured, as are conventional toys and novelty items, and then wrapped to maintain the sterility of the packaged product. The product package carrying the impact promotional item of the invention does not require any special handling in distribution and storage. In addition, the impact promotional item of the invention is not prone to theft while displayed at the point of sale and is shelf stable.

A printing line does not have to be retooled to provide a product package incorporating the impact promotional item of the invention. The impact promotional item of the invention may be added to a product package and delivered to the consumer with a minimal lead time. The appearance of the transferred image accurately reproduces the printed image so that the consumer is able to view an accurate facsimile of the impact promotional item before purchase. This boosts customer satisfaction, brand recognition, product differentiation, and product sales, while maintaining existing shelf imaging of the packaging. If necessary, printing inks and sublimation dyes may be blended in volumetric proportions suitable for providing a gray-balanced visible image on the product and a gray-balanced transferred image on the new image carrier such as a fabric, textile or other article. The visibility of the transferred image on the new image carrier advertises the product and/or product manufacturer to the viewing public, while delivering value to the consumer.

In addition to packages for consumer products, the principles of the invention are also applicable for promoting an organization by providing a transferrable image on advertising materials and the like. For example, the transferrable image may be used to promote sports and civic teams, sports and civic organizations, and sporting and civic events.

Various additional advantages and features of the invention will become more readily apparent to those of ordinary skill in the art upon review of the following detailed description taken in conjunction with the accompanying drawings.

DETAILED DESCRIPTION OF THE INVENTION

This invention relates to an impact promotional item for product packaging. In particular, this invention is directed to a printed image initially provided on a surface of a product package that incorporates a transferrable image component capable of being transferred as a transferred image to a substrate, such as a fabric, textile or other article. The image is typically printed on a visible panel of the product package using a blend of printing inks and sublimation dyes. The printing inks provide a visible or observable image on the product package that is a substantially accurate reproduction of the transferred image. If required, the blend of printing inks and sublimation dyes may be adjusted such that the color and gray balance of the transferred image accurately reproduces the color and gray balance of the image printed on the product package. As a result, the preprint design configuration ultimately achieves visual effect in both the package state and in the post-manufacturing sublimation application state. The appearance of the printed image on the product package is substantially unaffected by the blending of the sublimation dyes with the printing inks and is comparable to conventional printed ink images on product packages. The product package has a dual functionality for conventional usage and for promotional qualities.

Figure 1:
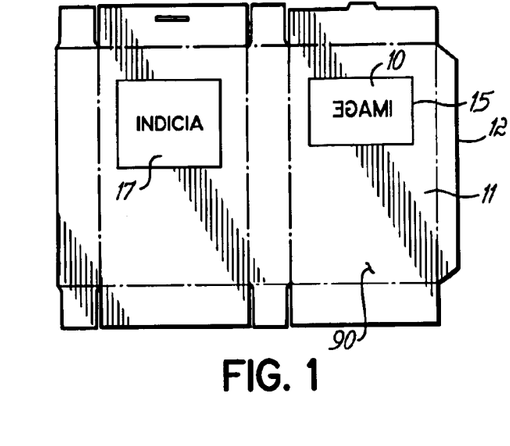
FIG. 1 is a diagrammatic view of a product package bearing a printed image in accordance with the principles of the invention.
Figure 2:
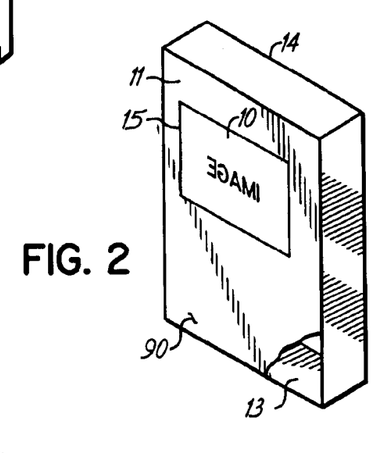
FIG. 2 is diagrammatic view of the product package of FIG. 1 after folding.

With reference to FIGS. 1 and 2, a printed pattern or image 10 is provided, as described below, as an impact promotional item on a board panel 11 of a carton blank 12 (FIG. 1) shaped as a flat parallelogram. The panels of blank 12 are folded along various fold lines and glued, after printing and forming, to define a three-dimensional product package 14 (FIG. 2). The product package 14 surrounds an interior space 13 capable of receiving a packaged product (not shown). Blank 12 includes an image side 90 that carries the printed image 10 and a non-image side 94, opposite to image side 90, that faces inwardly toward the interior space 13. A significant portion of the image side 90 is visible to an observer when the blank 12 is folded to form the product package 14. Additional printed indicia 17 pertinent to the product, such as product and brand identifiers, nutritional labels, bar codes, and other artwork, are also printed using one or more conventional printing inks on the panels of at least the image side 90 of blank 12.

The invention contemplates that the product package 14 may have any geometrical configuration characteristic of conventional product containers or cartons. Examples of such product packages are disclosed in U.S. Pat. Nos. 5,682,984, D290,584, 6,494,324, 6,082,614 and 3,549,082, each of which is hereby incorporated by reference herein in its entirety.

The printed image 10 may be positioned without limitation on the image side 90 of blank 12 and, subsequently on product package 14. The printed image 10 may be excised from the board panel 11 using a conventional cutting device, such as a pair of scissors. Alternatively, the printed image 10 may be encircled by score or tear lines 15 to facilitate removing the printed image 10 from the product package 14. Generally, the board panel 11 of blank 12 bearing the printed image 10 is perceivable to an observer or consumer viewing the exterior of the product package 14. If the product package 14 is commercially displayed, the printed image 10 may be positioned on a board panel 11 that is not observable from the front of the product package 14, although the invention is not limited to application to observable panels, which maintains brand recognition.

Blank 12 is formed from any of the grades or types of paperboard used in folding carton manufacture that are printing ink and sublimation dye receptive materials. In particular, blank 12 may be formed from paperboards such as clay coated newsback (CCN), uncoated recycled board (URB), solid bleached sulfate (SBS), natural kraft (NK), or coated unbleached kraft (CUK) available commercially as solid unbleached sulfate™ (SUS™) from Riverwood International (Atlanta, Ga.) or as coated natural kraft™ (CNK™) from MeadWestvaco Corporation (Stamford, Conn.). Typically, these grades of paperboard have a thickness that ranges from about 0.010 inches to about 0.032 inches. Blank 12 commonly has a surface coating that becomes tacky or sticky when heated so that contacting objects become removably adhered.

Figures 7, 8:
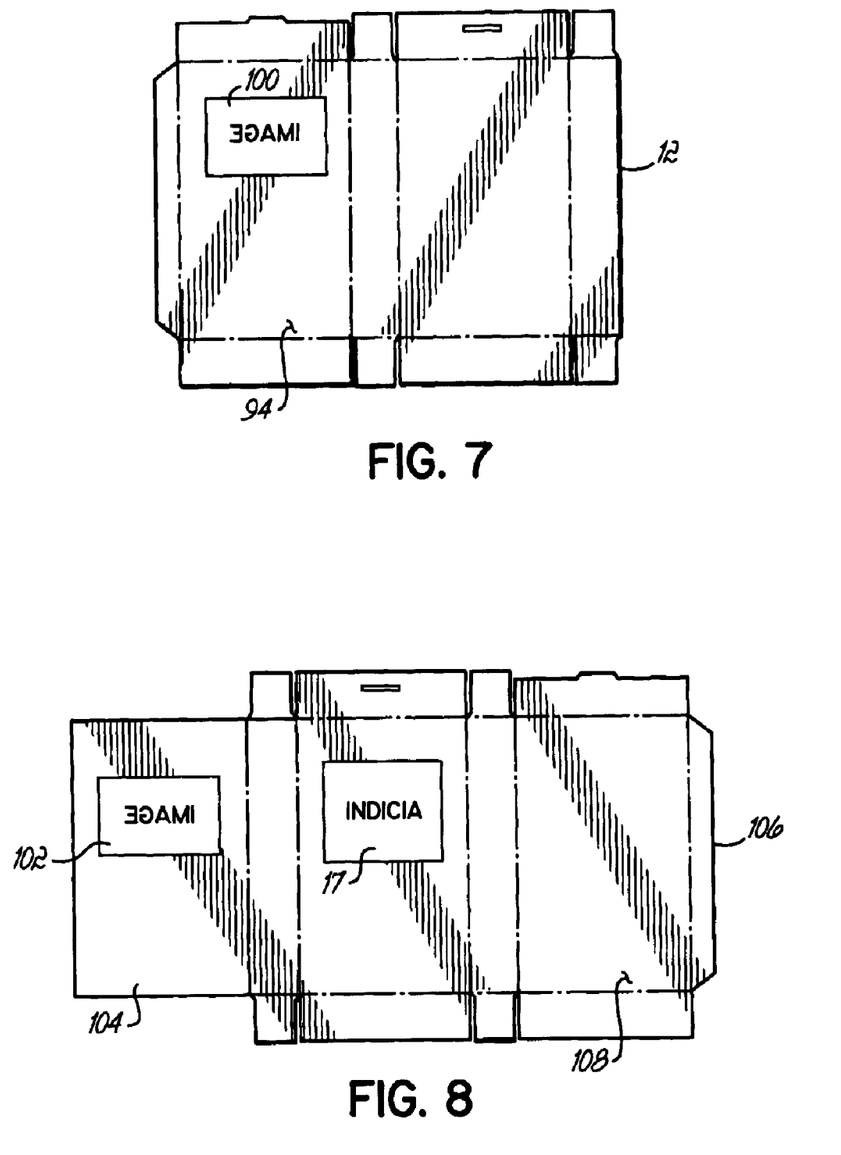
FIG. 7 is a diagrammatic view of a product package bearing a printed image in accordance with an alternative embodiment of the invention.
FIG. 8 is a diagrammatic view of a product package bearing a printed image in accordance with an alternative embodiment of the invention.

The printed image 10 is a composite of two overlapping and interlaced components—a transferrable image component and a visible image component—that are reverse printed onto the panel 11 or other portion of the package 14. As a result, the transferrable and visible images constituting printed image 10 are a mirror or reverse image of a transferred image 16 (FIG. 7). Features of the transferrable image component are typically registered with the features of the visible image component. The printed image 10 may be surrounded by a white or non-colored border (not shown) to clearly demarcate the image boundary. In certain embodiments of the invention, the visible image component of the printed image 10 may have features not present in the transferrable image component and, conversely, the transferrable image component of the printed image 10 may have features absent from the visible image component. The invention also contemplates that more than one distinct printed image 10 may be provided on separate surface areas of blank 12.

Figures 3, 6:
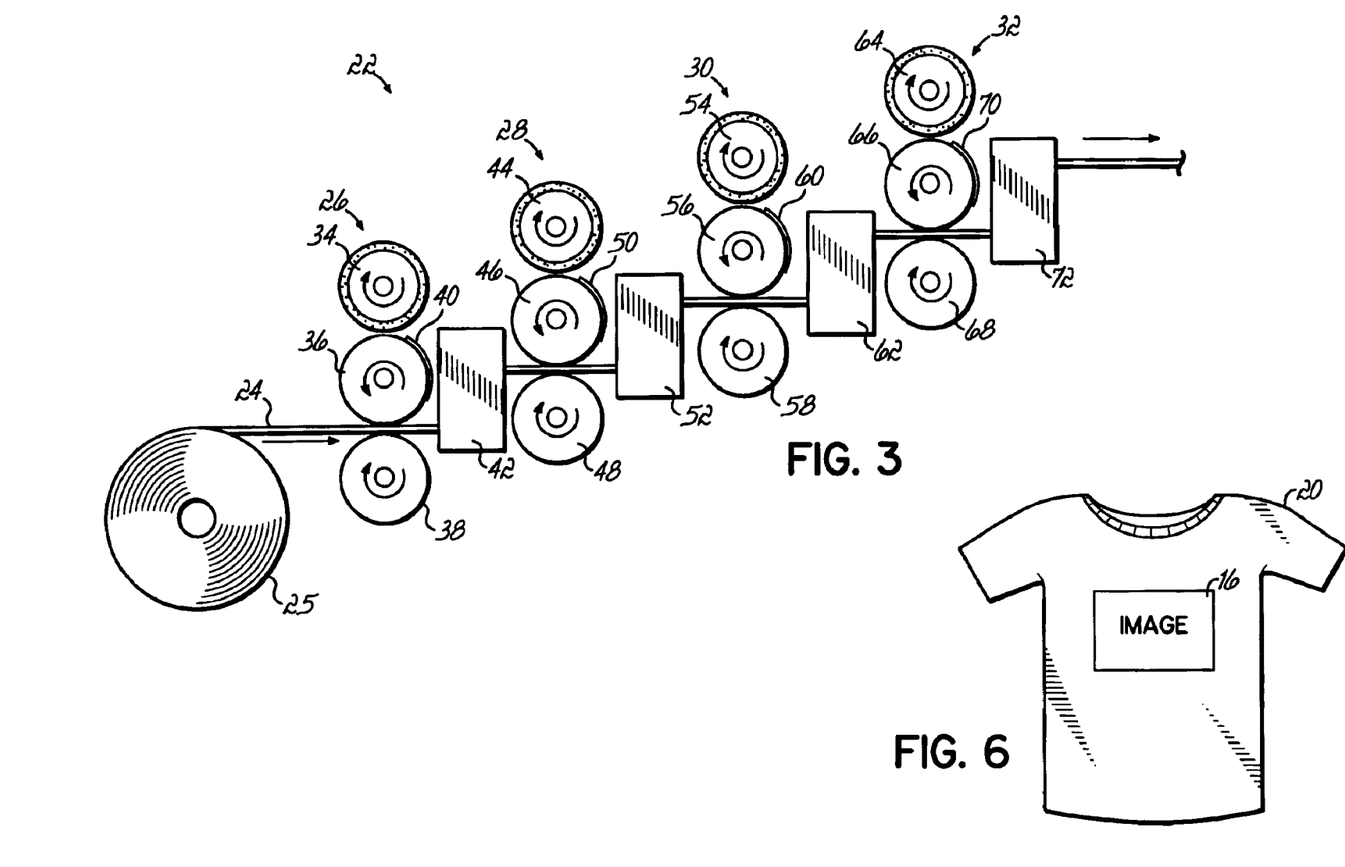
FIG. 3 is a diagrammatic view of a flexographic printing line suitable for applying a printed image to a product package in accordance with the principles of the invention.
FIG. 6 is a diagrammatic view of the fabric article of FIG. 5 carrying the image transferred from the product package.

The transferrable image component is constituted by sublimation dyes having thermal transferability when brought into contact with a new image carrier or substrate, such as a fabric article 20 (FIG. 7), and heated above a characteristic sublimation temperature. The sublimation dyes sublimate directly to the vapor state from the solid state for vapor-phase transport across the gap between the printed image 10 and fabric article 20 to the fibers forming fabric article 20. The sublimation vapors color the fibers constituting the fabric article 20, with the colors of the printed image 10 being reproduced in the transferred image 16 (FIG. 6). The visible image component of printed image 10 is constituted by printing inks that are preferably stable at temperatures at which the sublimation dyes sublimate.

The different colors of printing inks used to form the visible image component are each blended with a corresponding color of sublimation dye used to form the transferrable image component. Typically, the printing inks and sublimation dyes are both either water-based or solvent-based and miscible, and are homogeneously blended before being applied by a printing process to the board panel 11 of blank 12.

Printing inks are fluid or viscous compounds including a pigment that provides color and opacity finely dispersed in a vehicle typically including resin and a carrier. After the carrier is removed by evaporation, the pigment and resin of the printing ink form a hard film residue having the features of printed image 10 on board panel 11. Generally, sublimation dyes suitable for use in the invention are disperse dyes, such as those listed in the Colour Index, which is a publication that contains information on dye structures, classifications, manufacturers and processes. Disperse dyes suitable for use in the invention include, but are not limited to, azo, anthraquinone, quinophthalone, nitro, azomethine, and styryl-type dyes, which are disclosed, for example, in U.S. Pat. No. 4,576,610 (Donenfeld), U.S. Pat. No. 4,654,044 (Gilardone), U.S. Pat. No. 4,202,663 (Haigh), U.S. Pat. No. 4,021,591 (DeVires), U.S. Pat. No. 3,508,492 (Seibert), U.S. Pat. No. 3,502,495 (Akamatsu), and U.S. Pat. No. 2,911,280 (Cicogna), each of which is incorporated herein by reference in its entirety. Sublimation dyes and printing inks particularly suitable for rotogravure, lithography (offset, screen, silkscreen) and flexography are commercially available from Sun Chemical Corporation (Fort Lee, N.J.).

The printing ink and sublimation dye are blended to correlate the ink film thickness on the paperboard comprising the blank 12 with the density and thickness of the paperboard. The film thicknesses of the printing process are at levels of about $10^{-6}$ lbs/in$^2$ to about $10^{-5}$ lbs/in$^2$ solid coverage. Blank 12 is exposed to a heated environment inside a drying oven between successive printing steps that apply differently colored sub-images in the composite multicolor printed image 10. The film thickness must be controlled so that the sublimation dye is not adversely affected as each blend of printing ink and sublimation dye is dried before successive steps in the printing process to prevent smearing. In determining an appropriate film thickness, solvent or water vapor elimination during drying, which is related to the ink film thickness, is balanced against the stabilization of the specific blend without premature activation of the sublimation properties of the sublimation dye in the drying oven. Typically, the drying oven operates in the range of about 110° F. to about 280° F. and the sublimation dyes should be substantially stable in this temperature range. The speed of the printing line may be slowed if the film thickness is overly thick as the solvent or water content, which is substantially removed by heating, increases with increasing film thickness.

The transferrable image component and the visible image component may be produced by a suitable color printing process, such as a four-color process using a CMYK (cyan, magenta, yellow and black) color scheme or a hexachrome color process, or in particular, the PANTONE hexachrome color process that uses six primary colors (cyan, magenta, yellow, orange, green, and black). The printing inks and sublimation dyes may be blended in volumetric proportions suitable for providing a gray-balanced visible image on board panel 11 and a gray-balanced transferred image on fabric article 20 (FIG. 7). Gray balance in the transferred image 16 is achieved by providing proper proportions of the sublimation dyes, such as the colors yellow, magenta and cyan during a four-color printing process, to create the appearance of neutral gray with no apparent dominant hue after application to the fabric article 20. Similarly, gray balance in the visible image component of printed image 10 is achieved by providing proper proportions of the printing inks, such as the colors yellow, magenta and cyan in four-color process printing, to create the appearance of neutral gray with no apparent dominant hue. It is apparent by a person of ordinary skill in the art that the transferrable image component contributes to the perceived appearance of the printed image 10 and, therefore, gray balancing the visible image component must take the presence of the sublimation dyes into account.

To that end, the blend of printing inks and sublimation dyes used to print the printed image 10 may be adjusted proportionately to one another to provide proper gray balance in both the visible image component prominent on the product package 14 and the transferred image 16 transferred to fabric article 20. In an exemplary four-color CMYK process found to provide acceptable gray balance in printed image 10 and in transferred image 16, the yellow sub-image was printed with a 5:1 ratio of yellow printing ink to yellow sublimation dye, the magenta sub-image was printed with a 3:1 ratio, the cyan sub-image was printed with a 3:1 ratio, and the black sub-image was printed with a 2:1 ratio. As a result of the gray balance adjustment, the visible image component of the printed image 10 on the product package 14 resembles the transferred image 16 on the fabric article 20 and, preferably, the transferred image 16 represents an accurate reproduction of the printed image 10. The gray balance will vary depending upon the characteristics of the visible image component and the transferred image 16.

The invention contemplates that, in certain embodiments, the transferrable and visible image components of printed image 10 may be monochrome or printed using any other color combination rather than a four-color CMYK process, such as a five-color process, a hexachrome process, or a seven-color process. The printed image 10 may also be line copy consisting of solid lines and/or areas of specialty or line colors, which represent single colors blended for shade. Such line colors may be incorporated in any of the printed processes for providing the printed image 10.

FIG. 3 illustrates a flexographic printing line, generally indicated by reference numeral 22, that is capable of applying a series of substantially identical printed images 10 (FIG. 1) to a continuous web 24 unrolled from a supply roll 25. After printing, the web 24 is subsequently transformed into multiple blanks 12 by a forming process such as rotary die cutting. The flexographic printing line 22 includes a plurality of, for example, four stations 26, 28, 30 and 32 that each transfer a sub-image from among multiple color sub-images of printed image 10 in one of the characteristic colors of blended printing ink/sublimation dye to the web 24. The flexographic printing line 22 also includes additional stations (not shown) capable of repeatedly printing the indicia 17 (FIG. 1) on the web 24 using conventional printing inks. The invention contemplates that, if the printed image 10 can be printed using less than four stations 26, 28, 30 and 32, the unused ones of stations 26, 28, 30, and 32 may be used to print indicia 17.

As the stations 26, 28, 30 and 32 are identical, the following discussion of station 26 is equally applicable to stations 28, 30 and 32. Station 26 includes a set of rollers 34, 36 and 38, a flexible printing plate 40 attached to the curved outer surface of roller 38, and a drying oven 42. A replica of one of the color sub-images is graphically designed and transferred to the flexible printing plate 40 by any conventional technique, such as etching, laser engraving, or photolithography. The sub-image replica includes a relieved non-image area and a raised image area projecting above the non-image area. Roller 34 transfers amounts of the blend of printing ink and sublimation dye to the raised image areas on the flexible printing plate 40 at the nip between rollers 34 and 36. Subsequently, as roller 36 turns, the flexible printing plate 40 contacts the web 24 at the nip between rollers 36 and 38 and the blend of printing ink and sublimation dye is drawn out by absorption from the wetted raised areas of the flexible printing plate 40 to the web 24 so as to transfer the sub-image to the web 24. The web 24 is conveyed, typically in a convoluted path, through the drying oven 42 in which heat is applied to remove water or solvent from the transferred sub-image of printing ink and sublimation dye before the web 24 is transferred to the subsequent station 28. Similarly, a second color sub-image is transferred to the web 24 in station 30 by cooperative operation of rollers 44, 46, 48, flexible printing plate 50, and drying oven 52, a third color sub-image is transferred to the web 24 in station 32 by cooperative operation of rollers 54, 56, 58, flexible printing plate 60, and drying oven 62, and a fourth color sub-image is transferred to the web 24 in station 34 by cooperative operation of rollers 64, 66, 68, flexible printing plate 70, and drying oven 72.

The printing line 22 is coordinated or synchronized such that the different color sub-images printed by the various stations 26, 28, 30 and 32 are registered and constructively add to form printed image 10. Printing line 22 may be used, for example, to print printed image 10 with a four-color CMYK color printing process. The printed image 10 may be color balanced, although the invention is not so limited. The number of stations required in printing line 22 to print printed image 10 onto the web 24 depends upon the characteristics of printed image 10. For example, printed images 10 that are monochrome may be printed using a single one of stations 26, 28, 30 and 32 or printed images 10 that are dual color may be printed using two of the stations 26, 28, 30 and 32. Additional stations, similar to stations 26, 28, 30 and 32, may be added to the printing line 22 to print printed images 10 that are, for example, five-color, hexachrome or seven-color. An additional station may also be provided for applying a protective layer of water-base acrylic over the printed image 10.

The invention contemplates that printed image 10 may be produced by other mass-production, in-line printing techniques, such as rotogravure, lithography (offset), and screen (silkscreen) printing, capable of transferring an image to paperboard. For example, rotogravure is a rotary printing process in which the image is etched into a metal printing plate attached to a drum or cylinder. The cylinder is rotated through a trough containing printing ink and sublimation dye after which the etched surface is wiped clean by a doctor blade leaving the non-image area clean. The web is then passed between two rollers and pressed against the printing plate.

An existing printing line may be easily converted to a printing process that incorporates printed image 10, which provides cost effectiveness and efficiency due to the ready interchangeability. To that end, one or more printing plates are fabricated and installed in the existing printing line and the blended printing inks and sublimation dyes are substituted for conventional printing inks in those stations in the existing printing line that are applying the printed image 10. When the printing line is operational, the web 24 may be printed with a succession of images 10, in addition to indicia 17, without a reduction in production rate or throughput.

Figure 4:
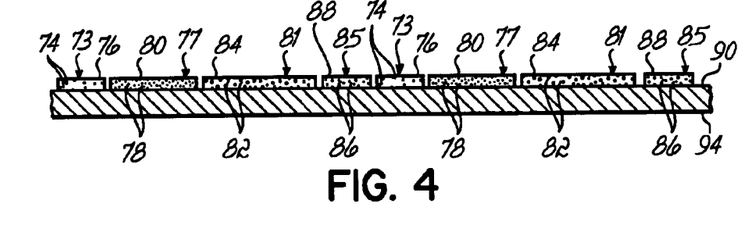
FIG. 4 is a diagrammatic enlarged view of the printed image of FIG. 1.

With reference to FIG. 4, the printed image 10 may be defined by more than one sub-image. The number of sub-images constituting printed image 10 depends upon the particular color printing process and the properties of the printed image 10 and the graphic design. In the four-color printing process illustrated in FIG. 3, a first color sub-image 73 incorporates a blend of a first sublimation dye 74 dispersed in a first printing ink 76, a second color sub-image 77 incorporates a blend of a second sublimation dye 78 dispersed in a second printing ink 80, a third sub-image 81 incorporates a third sublimation dye 82 dispersed in a third printing ink 84, and a fourth sub-image 85 incorporates a fourth sublimation dye 86 dispersed in a fourth printing ink 88. With regard to the exemplary four-color flexographic printing process depicted in FIG. 3, the first sub-image 73 is applied at station 26 by transfer from raised image areas on printing plate 40, the second sub-image 77 is applied at station 28 by transfer from raised image areas on printing plate 50, the third sub-image 81 is applied at station 30 by transfer from raised image areas on printing plate 60, and the fourth sub-image 85 is applied at station 32 by transfer from raised image areas on printing plate 70.

The sublimation dyes 74, 78, 82, and 86, after drying, constitute the transferrable image component of printed image 10 and the printing inks 76, 80, 84, and 88 principally constitute to the visible image component of printed image 10. The sublimation dyes 74, 78, 82, and 86 contribute the visual appearance of the printed image 10 but, primarily, participate in the visual appearance of the transferred image 16 on the fabric article 20 as the color effect of each of the sublimation dyes 74, 78, 82, and 86 is not fully manifested until after sublimation transfer.

Figure 5:
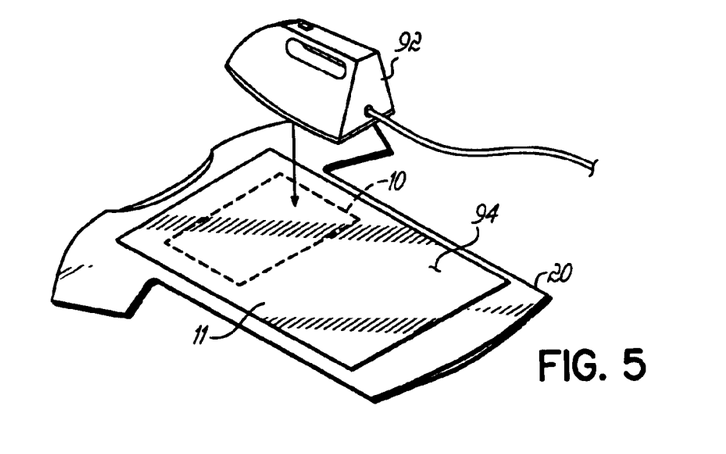
FIG. 5 is a diagrammatic view illustrating image transfer from the product package to a fabric article.

With reference to FIGS. 5 and 6, the transferable image component of the printed image 10 may be transferred as a transferred image 16 from the image side 90 (FIG. 1) of the board panel 11 to a new image carrier or substrate, such as a textile or a fabric article 20. The substrate may be, as a more specific example, a shirt of either cotton, a synthetic textile such as polyester, or a cotton-synthetic blend. To accomplish the transfer, the image side 90 of the board panel 11 carrying printed image 10 is positioned in a contacting relationship with a desired location on the fabric article 20. Alternatively, the portion of the board panel 11 carrying printed image 10 may be removed from panel 11 with a cutting device or by tearing along a perforation or the score lines 15.

A substantially constant pressure is applied by a heating device 92, such as a conventional iron or steam iron, to the non-image side 94 of the board panel 11 opposite to image side 90. The constant pressure applied by the heating device 92 provides a steady contact and proximity between the board panel 11 and the fabric article 20, which improves the transfer quality by reducing their separation. Heat is transferred from the heating device 92 through the thickness of the board panel 11, the sublimation dyes 74, 78, 82, and 86 (FIG. 4) in the printed image 10 are heated to a temperature sufficient to cause sublimation, and the sublimation dyes 74, 78, 82 and 86 sublimate as vapor or gas. Preferably, the pressure and temperature from heating device 92 are uniformly distributed over the board panel 11 in order to avoid blurring and distortion of the transferred image 16 and the uniform pressure and temperature are maintained for a time adequate to accomplish image transfer. Vapors are transferred from the sublimed sublimation dyes 74, 78, 82, and 86, in accordance with the pattern of the printed image 10, so that a replica of the printed image 10 is reproduced on the fabric article 20. Typically, the transfer process takes approximately 1 minute to 4 minutes at a temperature of about 325° F. to about 400° F. and with pressure in a range of about 3 pounds per square inch (psi) to about 40 psi applied during heating.

The invention contemplates that the transfer process may be accomplished using other types of heating devices 92, such as a conventional heat press, a conventional infrared illumination/heating system with applied pressure from a conventional pressure-exerting apparatus or a conventional resistance or microwave-type heating oven with applied pressure from a conventional pressure-exerting apparatus. The invention further contemplates that the transferrable image component of the printed image 10 may be utilized multiple times to transfer an image to a different fabric article 20, limited only by exhaustion of the sublimation dyes 74, 78, 82, and 86 in the printed image 10.

The coating on most board grades softens and becomes tacky or sticky when heated so that the board panel 11 carrying printed image 10 (FIG. 1) releasably adheres to the fabric article 20. Generally, the temperature required to sublimate the sublimation dyes 74, 78, 82, and 86 in the transferrable image component of the printed image 10 is sufficient to cause the surface coating of the board panel 11 to become tacky. This temporary adhesion maintains the board panel 11 carrying printed image 10 stationary relative to the fabric article 20 during the transfer process. As a result, the transferred image 16 is significantly less likely to be blurred or distorted due to unintentional movement of the board panel 11 and printed image 10 relative to the fabric article 20 for the duration of the transfer process.

With reference to FIG. 7 in which like reference numerals refer to like features in FIGS. 1–6 and in accordance with an alternative embodiment of the invention, a printed image 100, similar or identical to printed image 10 (FIG. 1), may be applied at a location on the non-image side 94 of the blank 12. This would likely require one pass through a printing line to apply indicia 17 (FIG. 1) to the image side 90 of blank 12 and a second pass through a printing line to apply the printed image 10 on the non-image side 94. When the blank 12 is folded to form product package 14 (FIG. 2), printed image 100 faces inwardly toward the interior space 13 and is hidden or concealed from an observer. Therefore, as printed image 100 is not visible on the product package 14, the printed image 100 may be printed using blends of printing inks and sublimation dyes for each color used to construct the printed image 100 or, alternatively, may be printed using only sublimation dyes. The printed image 100 is applied in the same or similar manner as printed image 10, as described above, and has the same or substantially the same characteristics as printed image 10, also as described above. Despite the need for a second pass, printed image 100 remains cost-effective relative to conventional promotional items as the costs of item wrapping and package dropping are avoided and the costs associated with manufacturing a toy or novelty item are not incurred.

With reference to FIG. 8 in which like reference numerals refer to like features in FIGS. 1–7 and in accordance with an alternative embodiment of the invention, a printed image 102, similar or identical to printed image 10 (FIG. 1) and printed image 100 (FIG. 7), may be applied on a panel 104 extending from a side edge of a blank 106 similar to blank 12 (FIG. 1). Printed image 102 may be printed on either the image side 108 or the non-image side (not shown) of panel 104. As a result, printed image 102 and indicia 17 may be printed using one or more passes through a printing line. When the blank 12 is folded to form product package 14 (FIG. 2), the panel 104 bearing printed image 102 is disposed inside of the interior space 13 and hidden from the view of an observer or consumer. Therefore, as printed image 102 is not visible on the product package 14, the printed image 102 may be printed using blends of printing inks and sublimation dyes for each color used to construct the printed image 102 or, alternatively, may be printed using only sublimation dyes. The printed image 102 is applied to the blank 106 in same or similar manner as printed image 10 is applied to blank 12, as described above, and has the same or substantially the same characteristics as printed image 10, also as described above.

While the present invention has been illustrated by a description of various preferred embodiments and while these embodiments have been described in considerable detail in order to describe the best mode of practicing the invention, it is not the intention of applicant to restrict or in any way limit the scope of the appended claims to such detail. Additional advantages and modifications within the spirit and scope of the invention will readily appear to those skilled in the art. The invention itself should only be defined by the appended claims, wherein

I claim:

1. A consumer product package comprising:
   a foldable blank having a panel, said foldable blank forming the consumer product package when folded;
   a transferrable image printed onto said panel, said transferrable image including a sublimation dye capable of being transferred thermally from said panel to an image carrier; and
   a visible image printed onto said panel, said visible image containing a pigment characteristic of a printing ink and overlapping with said transferrable image.

2. The consumer product package of claim 1 wherein features of said visible image are registered with corresponding features of said transferrable image.

3. The consumer product package of claim 1 wherein said transferrable image includes a plurality of sublimation dyes each of a different color and said visible image includes a plurality of printing inks each of a different color.

4. The consumer product package of claim 3 wherein said transferrable image is characterized by at least three sublimation dyes of different color proportionately present so that said transferrable image is gray balanced.

5. The consumer product package of claim 3 wherein said visible image is characterized by at least three printing inks of different color proportionately present so that said visible image is gray balanced.

6. The consumer product package of claim 3 wherein one of said plurality of sublimation dyes is black.

7. The consumer product package of claim 3 wherein each of said plurality of sublimation dyes is coordinated spatially with a corresponding one of said plurality of printing inks.

8. The consumer product package of claim 1 wherein said visible image and said transferrable image are applied to said panel with a total thickness ranging from about $10^{-6}$ lbs/in$^2$ to about $10^{-5}$ lbs/in$^2$ solid coverage.

9. The consumer product package of claim 1 wherein said transferrable image is characterized by at least three sublimation dyes of different color proportionately present so that said transferrable image is gray balanced.

10. The consumer product package of claim 1 wherein said panel is positioned inside of said consumer product package after said foldable blank is folded to form said consumer product package.

11. The consumer product package of claim 1 wherein said panel has a visible side and a non-visible side opposite said visible side after said foldable blank is folded to form said product package, said transferrable image being located on said non-visible side.

12. The consumer product package of claim 1 wherein said printing ink and said sublimation dye are blended into a composition and printed simultaneously onto said panel.

13. The consumer product package of claim 1 wherein features of said visible image overlap with corresponding features of said transferrable image.

14. A promotional item for a consumer product package having a panel, comprising:
 a transferrable image printed onto the panel, said transferrable image including a sublimation dye capable of being transferred thermally from the panel to an image carrier such as a fabric article; and
 a visible image printed onto the panel, said visible image containing a pigment characteristic of a printing ink and overlapping with said transferrable image.

15. The promotional item of claim 14 wherein said visible image includes features registered with corresponding features of the transferrable image.

16. The promotional item of claim 15 wherein said printing ink and said sublimation dye are blended into a composition and printed simultaneously onto the panel.

17. The promotional item of claim 14 wherein said transferrable image includes a plurality of sublimation dyes each of a different color and said visible image includes a plurality of printing inks each of a different color.

18. The promotional item of claim 17 wherein said transferrable image is characterized by at least three sublimation dyes of different color proportionately present so that said transferrable image is gray balanced.

19. The promotional item of claim 17 wherein said visible image is characterized by at least three printing inks of different color proportionately present so that said transferrable image is gray balanced.

20. The promotional item of claim 17 wherein one of said plurality of sublimation dyes is black.

21. The promotional item of claim 17 wherein each of said plurality of sublimation dyes is coordinated spatially with a corresponding one of said plurality of printing inks.

22. The promotional item of claim 14 wherein said visible image and said transferrable image are applied to the panel with a total thickness ranging from about $10^{-6}$ lbs/in$^2$ to about $10^{-5}$ lbs/in$^2$ solid coverage.

23. The promotional item of claim 14 wherein said transferrable image is characterized by at least three sublimation dyes of different color proportionately present so that said transferrable image is gray balanced.

24. The promotional item of claim 1 wherein features of said visible image overlap with corresponding features of said transferrable image.

* * * * *

UNITED STATES PATENT AND TRADEMARK OFFICE
CERTIFICATE OF CORRECTION

PATENT NO.    : 6,916,765 B2
DATED         : July 12, 2005
INVENTOR(S)   : Joseph P. Yock It is certified that error appears in the above-identified patent and that said Letters Patent is hereby corrected as shown below:

Column 12,
Line 26, "claim 1 wherein", should read -- claim 14 wherein --.

Signed and Sealed this

Sixth Day of December, 2005

JON W. DUDAS
*Director of the United States Patent and Trademark Office*